(12) United States Patent
Ishibe

(10) Patent No.: US 6,355,082 B1
(45) Date of Patent: Mar. 12, 2002

(54) METAL FILTER

(75) Inventor: Hideomi Ishibe, Hirakata (JP)

(73) Assignee: Nippon Seisen Co., Ltd., Osaka-fu (JP)

( * ) Notice: Subject to any disclaimer, the term of this patent is extended or adjusted under 35 U.S.C. 154(b) by 0 days.

(21) Appl. No.: 09/554,658

(22) PCT Filed: Oct. 12, 1999

(86) PCT No.: PCT/JP99/05628

§ 371 Date: Jul. 19, 2000

§ 102(e) Date: Jul. 19, 2000

(87) PCT Pub. No.: WO00/21641

PCT Pub. Date: Apr. 20, 2000

(30) Foreign Application Priority Data

Oct. 12, 1998 (JP) ............................................. 10-289611
Sep. 30, 1999 (JP) ............................................. 11-279899

(51) Int. Cl.⁷ ................................................. B01D 29/07
(52) U.S. Cl. ......................... 55/528; 55/385.2; 55/523; 210/493.5; 210/494.2; 210/500.25
(58) Field of Search ............................. 55/385.1, 385.2, 55/523, 525, 528; 210/315, 342, 487, 493.1, 493.5, 494.2, 496, 499, 500.25, 510.1

(56) References Cited

U.S. PATENT DOCUMENTS

| | | | | |
|---|---|---|---|---|
| 2,267,918 A | * | 12/1941 | Hildabolt | 210/510.1 |
| 2,463,825 A | * | 3/1949 | Strassheim | 210/493.5 |
| 2,925,650 A | * | 2/1960 | Pall | 210/510.1 |
| 3,165,473 A | * | 1/1965 | Pall et al. | 210/493.1 |
| 5,114,447 A | * | 5/1992 | Davis | 210/510.1 |
| 5,772,738 A | * | 6/1998 | Muraoka | 55/385.2 |
| 5,782,942 A | * | 7/1998 | Wu | 55/385.1 |
| 6,149,702 A | * | 11/2000 | Kawano et al. | 55/528 |

FOREIGN PATENT DOCUMENTS

WO          9306912          5/1993

\* cited by examiner

*Primary Examiner*—David A. Simmons
*Assistant Examiner*—Minh-Chau T. Pham
(74) *Attorney, Agent, or Firm*—Birch, Stewart, Kolasch & Birch, LLP

(57) ABSTRACT

It is a metal filter 1 including a fine filtering layer 3 and a supporting member 2 sintered to be porous and having a covering surface 4 to integrate the fine filtering layer 3 into a laminate to maintain its shape. The average pore diameter of the fine filtering layer 3 is set to be smaller than an average pore diameter of the supporting member 2. The covering surface 4 is formed in an uneven shape so as to allow a filtering surface of the fine filtering layer 3 to be an undulating filtering surface 3A such that the area ratio S1/S0 of its real filtration area S1 to the standard filtration area S0 of the case where it is not formed in an uneven shape, is larger than or equal to 1.3. The average thickness of the fine filtering layer 3 at valley portions 6 of the uneven shape is set to be larger than the average thickness of the fine filtering layer 3 at the crest portions 5 of the uneven shape, and the undulating filtering surface 3A is formed in a smoothly curved surface shape.

7 Claims, 7 Drawing Sheets

METAL FILTER

This application is the national phase under 35 U.S.C. § 371 of PCT International Application No. PCT/JP99/05628 which has an International filing date of Oct. 12, 1999, which designated the United States of America.

TECHNICAL FIELD

The present invention relates to a metal filter capable of filtering a fluid such as a molten polymer or various gases such as a gas for producing semiconductors, with high precision and good efficiency.

BACKGROUND ART

Conventionally, porous sintered bodies obtained by molding and sintering a powdery metal substance such as metal fibers or metal powder are, owing to the following advantages, used in numerous fields of filtration recently in particular such as for filtering a process gas for producing semiconductors, for example, as a filter capable of removing fine particles of 0.01 $\mu$m or less with high precision.
1. That the filtration characteristics can be adjusted in accordance with the type of the powdery substance such as the size of the powder or fibers to be used.
2. That they have a high heat resistance and a corrosion resistance, and can be applied to numerous types of gases, and in addition can withstand a high temperature process such as a baking process.
3. That they, being excellent in mechanical processability, can be welded and post-processed, and can be easily joined and integrated with a housing or a pipe line.
4. That they have a large mechanical strength and have a high pressure resistance and toughness.

Meanwhile, in the case where a sintered body having a small pore diameter was to be produced for improvement in filtration precision in such a metal filter, the powdery substance such as metal powder or metal fibers was made finer or the thickness of the sintered body was increased in order to utilize the thickness effect of the sintered body. Such a filter gives a large pressure loss and decreases the filtration efficiency.

For this reason, the present applicant in the international patent publication WO93/06912 proposes a sintered body obtained by immersing a porous supporting member in a suspension containing a powdery substance suspended therein without using a binder and evacuating it to form a fine particle layer for sintering.

According to this proposal, since fine metal particles are molded to have a thickness as small as possible and carried on a supporting member, it is possible to obtain a filter being excellent in filtration precision and capable of restraining the pressure loss. As a result, a constant filtration process is made possible with a small filtration area by being capable of suppressing the pressure loss, thereby contributing to space saving such as scale reduction of apparatus and reduction of space between equipped pipe lines. Here, the filter can be made in various shapes and configurations such as plate-like, tubular, and cup-like, and can also be machined.

However, in filtration apparatus of recent years, a further improvement in the filtration precision and a further decrease in the pressure loss are desired.

In order to reduce the pressure loss, enlarging the filtration area is effective; and, in conventional cases also, regarding a filter composed for example of a flexible non-woven fabric or a network, a chemical synthetic fiber filter or the like which is bent in a waveform or fluted after its molding is used. However, the aforesaid metal sintered body, in particular a metal sintered body made of a laminate such as in the aforesaid proposal, is liable to generate cracks and cleavages easily by a bending process after the molding.

For this reason, in order to increase the filtration area in such a metal sintered body, it may be considered to make an uneven surface by partially grinding and pressing a filtering layer or consciously allowing the adsorption amount of the powdery substance to be non-uniform at some places at the time of suction-molding to impart an uneven surface to the filtering layer to respectively increase the filtration area. However, methods according to machining are liable to cause decrease in the filtration efficiency due to generation of grinding burr and partial high density at a processed portion to clog the pores. Also, by consciously changing the lamination thickness as in the latter case, it is difficult to form an uneven shape to such a degree that the filtration area increases, particularly in a comparatively small filter. Moreover, there is a problem that partial variation in the pressure loss increases.

DISCLOSURE OF THE INVENTION

The object of the present invention is to provide a metal filter being highly precise and excellent in filtration efficiency based on the idea of making the filter to have an undulating filtering-surface by allowing the covering surface of the supporting member to be uneven and covering the surface with a fine filtering layer, and of allowing the filtration layer thickness at valley portions on the undulating filtering surface to be larger than the filtration layer thickness at the summits of crest portions so that a fluid to be processed flows uniformly through the filter.

In order to achieve the aforesaid object, the present invention provides a metal filter comprising a fine filtering layer having a thickness that cannot by itself maintain its shape against filtration pressure, and a supporting member sintered to be porous and having a covering surface to integrate the filtering layer into a laminate to maintain the shape, wherein an average pore diameter of pores of said fine filtering layer is et to be smaller than an average pore diameter of pores of said supporting member, and said covering surface of said supporting member is formed in uneven shape having crest portions so as to allow a filtering surface of the fine filtering layer to be an undulating filtering surface such that an area ratio S1/S0 of its real filtration area S1 to a standard filtration area S0 of the case where it is not formed in an uneven shape, is larger than or equal to 1.3, and that an average thickness of said fine filtering layer at valley portions between said crest portions is set to be larger than an average thickness of said fine filtering layer at the crest portions, and the filtering surface of said fine filtering layer is formed in a smoothly curved surface shape.

Said supporting member may comprise a tubular body in which said crest portions are adjacent to one another in a circumferential direction and extend in an axial direction; and a pitch of the crest portions in the circumferential direction may be set to be 2 to 4 times as large as an elevation height of the crest portions from said valley portions to said crest portions. Said fine filtering layer may be a porous sintered body of a powdery substance containing metal short fibers having an average diameter d smaller than or equal to 3 $\mu$m and an average of an aspect ratio L/d of length L to diameter d being 2 to 20.

Further, it may be a metal filter which filters a gas so that the number of particles having a size larger than or equal to 0.01 μm is substantially smaller than or equal to $10^{-10}$, and in which said gas is a gas for producing semiconductors.

Thus, the metal filter can perform a high precision filtration efficiently and also is provided with a mechanical strength by forming an undulating filtering surface to make improvements in the filtration area, allowing the fine filtering layer to have such a thickness that cannot by itself withstand the filtration pressure, and allowing the maintenance of the filter shape to be carried out substantially by the supporting member.

In such a filter, the covering surface of the supporting member in the present invention is formed in an uneven shape having crest portions, and is made into an undulating filtering surface by covering the fine filtering layer along the uneven shape. The degree of undulation for this case is set to be larger than or equal to 1.3 times as large as the filtration area of the case where the undulating shape is not formed.

The reason why the filtration area ratio is set to be larger than or equal to 1.3 is as follows. If the fluid to be processed is, for example, a high-purity gas or a polymer as a target, ordinary filters having fine pores tend to increase the pressure loss to cause denaturing during the processing. In order to prevent this, there is a necessity of performing the filtration efficiently, and also there is an already-made size for filter containers. Further, if laminate structures having such different pore characteristics are integrated, for example, by sintering, it is preferable to set said filtration area ratio to be at least equal to or larger than 1.3 times in order to restrain the layer exfoliation and generation of cracks caused by difference in heat-shrinkability. However, setting the filtration ratio to be larger than necessary makes the undulation pitch rather narrow or produces large projections, so that it is difficult to form a good fine filtering layer. Therefore, it is preferably set to be smaller than or equal to 5 times, more preferably 1.5 to 3 times.

Further, in such a laminated metal filter having an uneven shape formed thereon, it is often the case that the flow resistance differs at each portion in accordance with the overall uneven thickness. Therefore, in a filter in which the unevenness is simply formed to increase the filtration area, portions having a smaller flow resistance preferentially undergo the filtration process, thereby causing retention or denaturing.

Therefore, in the present invention, the problems have been solved by setting the filtration layer thickness of at least the crest portions of the uneven shape, where the flow resistance is large, to be smaller than the filtration layer thickness at the valley portions in order to use the entire filter surface uniformly.

BEST MODE FOR CARRYING OUT OF THE INVENTION

Figure 1:
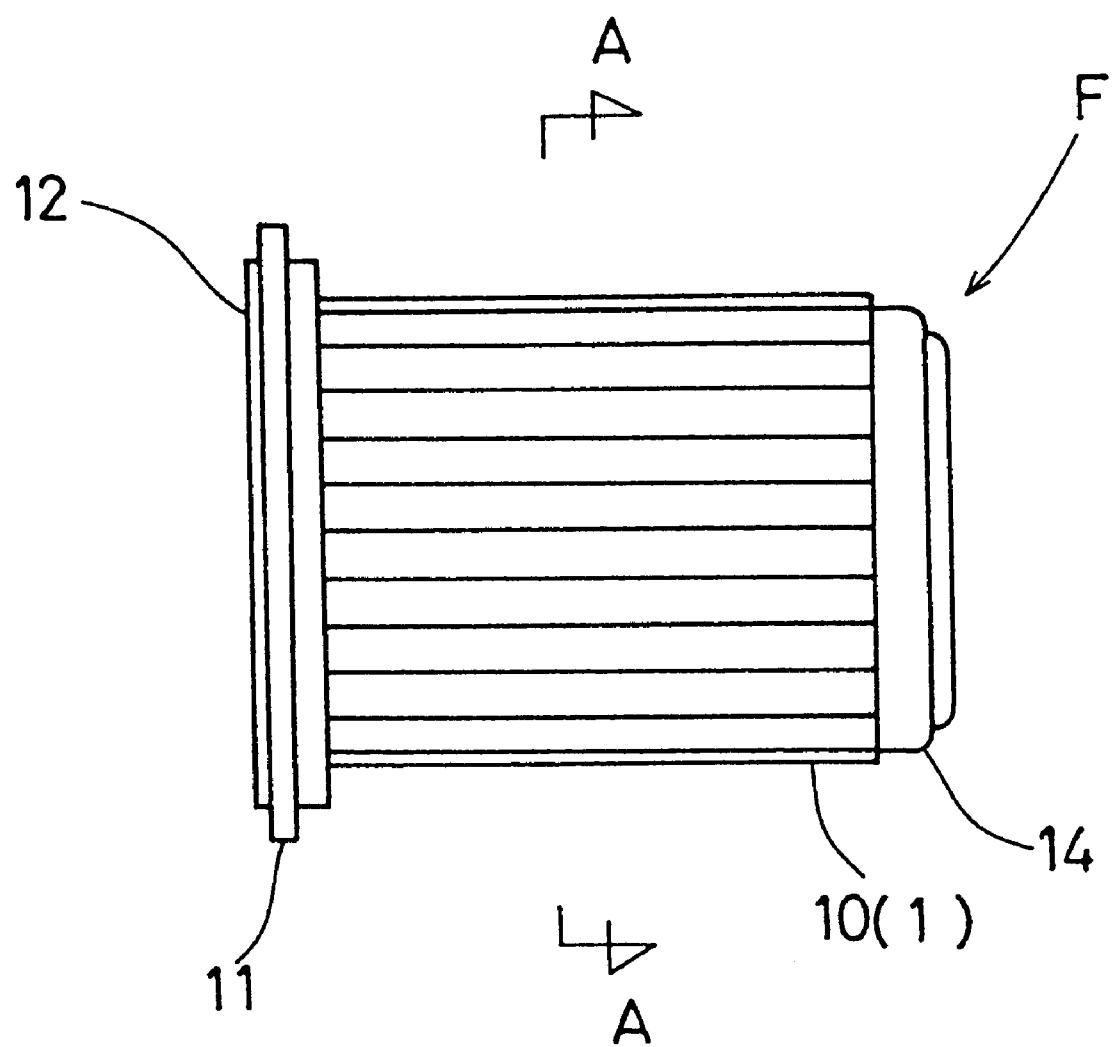
FIG. 1 is a front view illustrating an example of a filter F having a metal filter according to the present invention.
Figure 2:
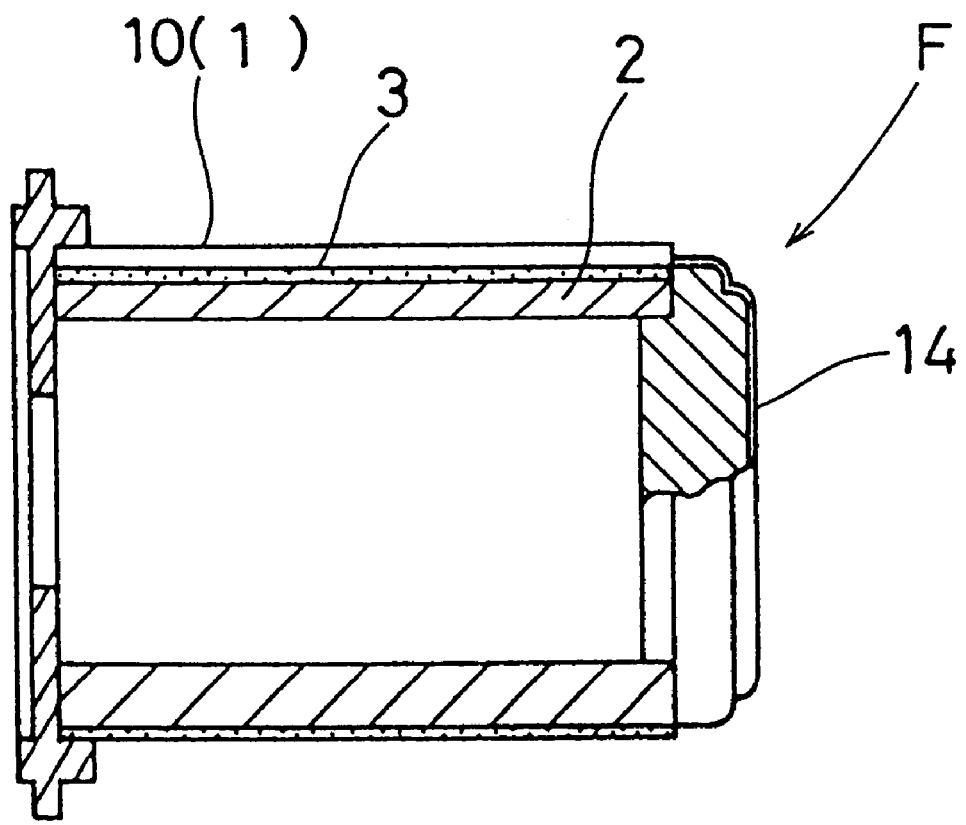
FIG. 2 is a vertical cross section view thereof.

Hereafter, an embodiment of the present invention will be explained on the basis of the drawings.

In the drawings, a filter F in this example is formed as a tubular filter having a bottom. An attachment brim 12 having a flange 11 is disposed at one end of a tubular section 10. The other end is closed by a lid 14. These are integrally bonded, for example, by welding or soldering. Further, in this example, the aforesaid tubular section 10 and lid 14 are made of a filter material, and the tubular section 10 corresponds to a metal filter 1 according to the present invention. Thus, the metal filter 1 of the present invention may be used as a part of the filter F, or the filter F can be made only of the metal filter 1.

Figure 3:
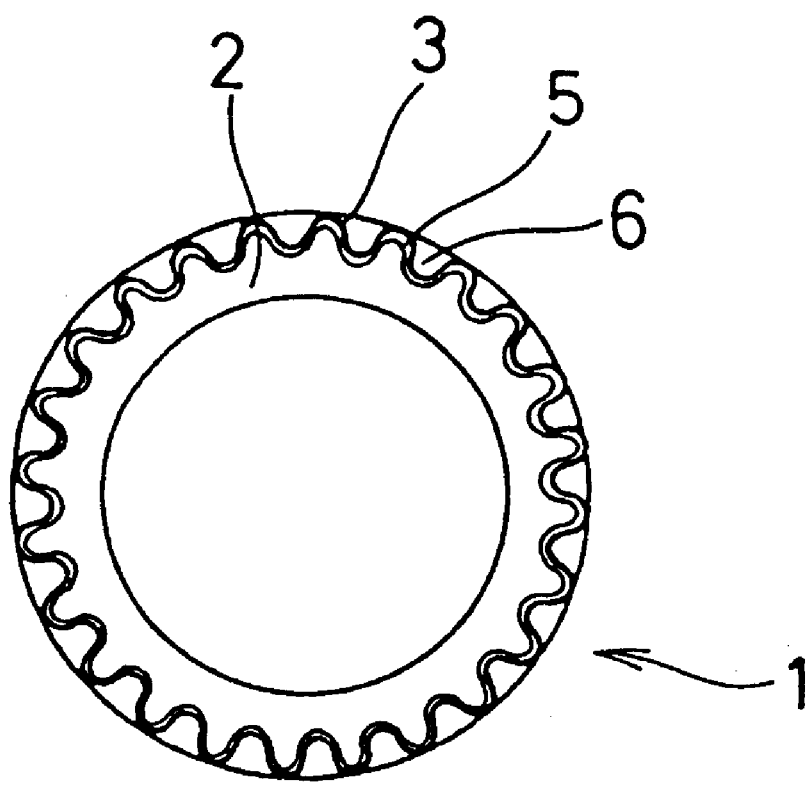
FIG. 3 is a cross section view cut along the line A—A of FIG. 1.
Figure 4:
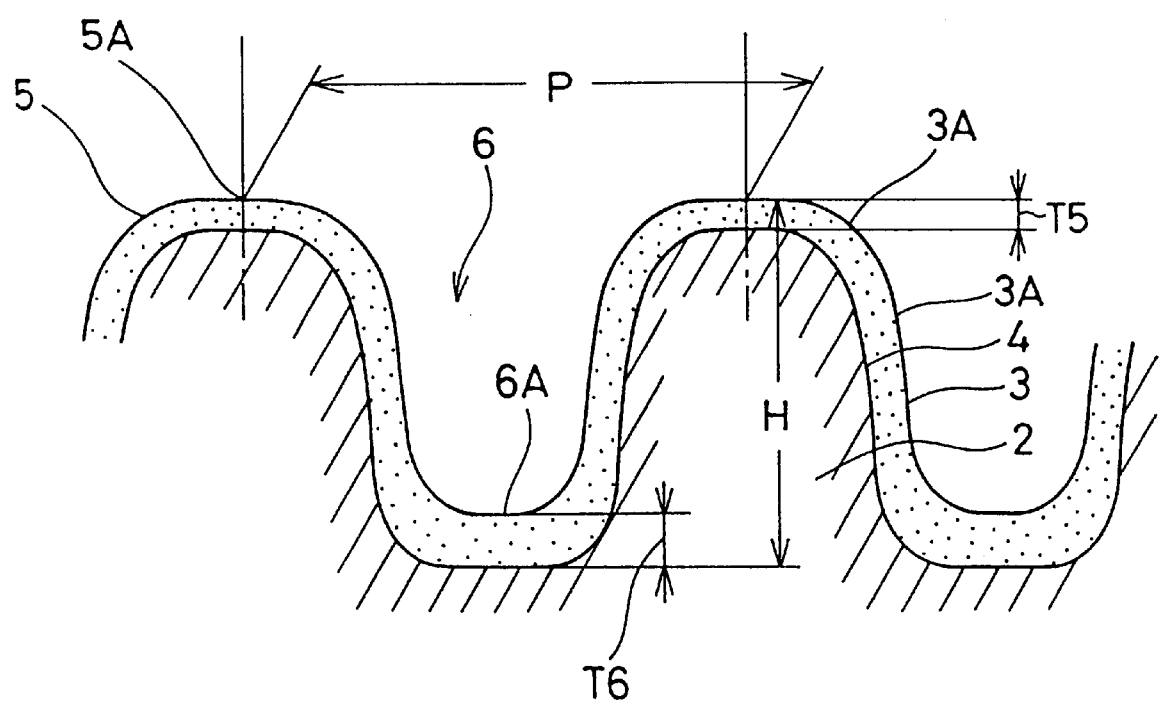
FIG. 4 is a partial enlarged cross section view.
Figure 5:
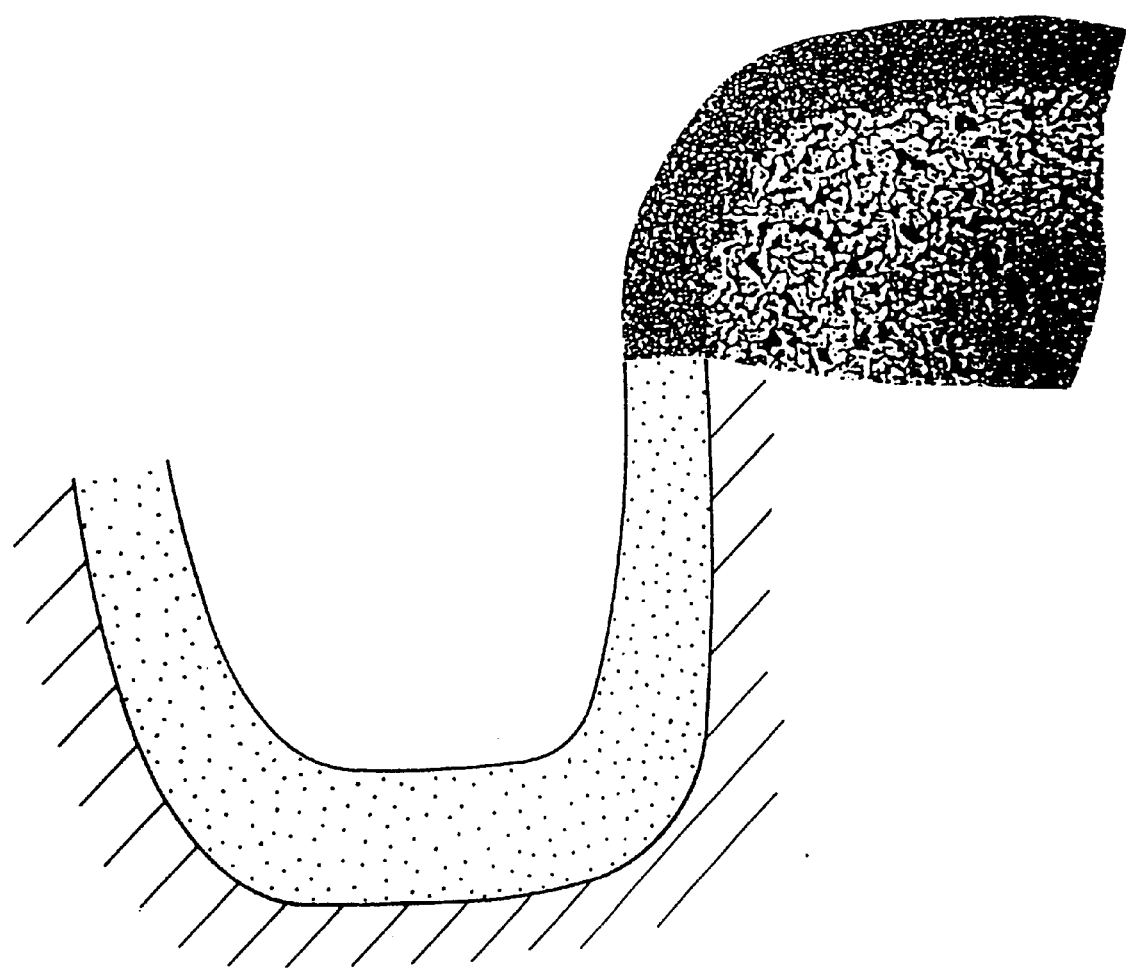
FIG. 5 is a cross section view shown enlarged by 100 times.

Further, as shown enlarged in FIGS. 3 to 5, the metal filter 1 is formed by integrally sintering a support member 2, which is made of a tubular body having a comparatively thick tubular section 10, and a fine filtering layer 3 that covers a covering surface 4 located on its outer circumference.

Furthermore, the aforesaid supporting member 2 performs functions as a porous tubular base material for supporting and forming the aforesaid fine filtering layer 3 as well as reinforcement in the metal filter 1, so that the supporting member 2 need not be made to have fine pores for filtration such as in the fine filtering layer 3. Therefore, the supporting member 2 is made of a metal sintered body obtained by sintering an ordinary metal powder (for example, having a diameter of about 10 to 100 μm) such as stainless steel or nickel, has comparatively large pores, and is provided with a sufficient thickness that can withstand high pressure.

Further, in order to undulate the aforesaid fine filtering layer 3 to increase the filtration area, either one of the surfaces of the supporting member 2, i.e. the covering surface 4 on said outer circumference in this example, is made in an uneven shape by disposing longitudinally extending mountain-like crest portions 5 with spacing in the circumferential direction. Here, the pitch in the circumferential direction is preferably the same spacing so as to increase the uniformity of the filtration.

The supporting member 2 as described above can be produced by sintering a molded product obtained by introducing and pressurizing a powder between an inner mold 15 and an outer mold 16. The uneven covering surface 4 having crest portions 5 is formed, for example, by forming cut grooves 16A in the inside of the outer mold 16. Here, a case may be considered in which the crest portions 5 are formed as independent small projections which are disconnected in the longitudinal direction instead of the continuous ones. In this case, the outer mold 16 must be formed in segments that can be divided in the circumferential direction, thereby leading to increased costs in production; and moreover, at the time of introducing and pressurizing the powdery substance, for example, the tissue is made non-uniform to easily generate broken portions, so that the workability and the production yield will be inferior. Therefore, the crest portions 5 are preferably made continuous in the longitudinal direction. Further, the supporting member 2 may be formed as a comparatively long body in molding and sintering, and then cut to a predetermined length for use.

The covering surface 4 having such an uneven shape is made into an undulating filtering surface 3A having a shape in which the surface of the fine filtering layer 3 is undulated, by fitting the fine filtering layer 3 onto the shape and carrying it on the surface. This can increase the filtration area without bending or the like after molding. The undulating state of the filtering surface 3A may be such that the circumferential pitch P at which the crest portions 5 are adjacent to each other in the circumferential direction is 2 to 4 times as large as the elevation height H from the bottoms 6A of the valley portions 6 between the aforesaid crest portions 5, 5 to the summits 5A of the crest portions 5. For example, if the elevation height H is too large, that is, if the circumferential pitch P is comparatively too small, then it will be difficult to cover the covering surface 4 down to the bottoms 6A with the fine filtering layer 3. Further, the circumferential pitch P is preferably, for example, 0.5 to 10 mm (more preferably about 1 to 8 mm, still more preferably about 2 to 6 mm), and the elevation height H may be, for example, about 0.5 to 6 mm (preferably 1 to 3 mm). Suitable ranges are set in accordance with the intended usage of the filter and the desired filtration precision and filtration efficiency.

Furthermore, the entire surface of the aforesaid crest portions 5 and the valley portions 6 between them is made in a smoothly curved surface shape so as not to generate sharp portions over the entire covering surface including the summits 5A and the bottoms 6A, and is made to have an increasing width or a wave-like shape in its cross section so as to become narrower towards the bottoms 6A. Here, it is also preferable that the covering surface 4 is made in a tilted shape of such a degree that it does not have a tilted portion that is tilted towards the side of falling into the valley portions 6 by forming an obtuse angle at least with the radial line, so as to maintain the adhesiveness of the fine filtering layer 3.

By forming the covering surface 4 to have such an uneven shape, the filtering surface of the fine filtering layer 3 is made into an undulating filtering surface 3A as described above, and the area ratio S1/S0 of the real filtration area S1 of the undulating filtering surface 3A to the standard filtration area S0 of the case where it is not formed in an uneven shape is set to be larger than or equal to 1.3. Here, the real filtration area S1 refers to a filtering surface area obtained by actually measuring the aforesaid undulating filtering surface 3A along its undulating surface, and the standard filtration area S0 refers to a filtration area in the case where a fine filtering layer 3 having an average thickness of the aforesaid filtering layer is formed on a surface that passes through a middle height (½·H) when it does not have an uneven shape made of the aforesaid crest portions 5. Also, if the metal filter 1 is a plate-like body, the standard filtration area S0 refers to the filtration area on that plane.

If this area ratio is smaller than 1.3, the increase in the filtration area cannot be said to be sufficient as described above, and if the undulation pitch is large, surface damages are likely to be invited due to, for example, falling or hitting caused by carelessness in handling a product. Here, if the area ratio is too large, it is inferior in moldability, so that the area ratio may be smaller than or equal to 5, preferably about 1.5 to 3.0.

The aforesaid fine filtering layer 3 is a part that substantially performs a filtering function, and a fine powder is used therein as a powdery substance to allow the fine filtering layer 3 to have a smaller pore diameter than that of the aforesaid supporting member 2. Further, in the case where the metal filter 1 is used for precision filtration of a process gas or the like for producing semiconductors, the powdery substance to be used is selected so as to be provided with a precision that renders the number of fine particles having a size larger than or equal to 0.01 $\mu$m, more preferably larger than or equal to 0.003 $\mu$m, to be smaller than $10^{-10}$ or below that level. The powdery substance for use may be fine metal particles, metal short fibers, or a mixture thereof.

The aforesaid metal particles for use are preferably a powdery substance having a diameter of, for example, about 0.5 $\mu$m or less, and are preferably a material being excellent in corrosion resistance such as a stainless steel SUS316L, for example.

The aforesaid metal short fibers are allowed to have an aspect ratio (L/d) of about 2 to 20. In a sintered body formed of a powdery substance containing metal short fibers having an average aspect ratio of 2 to 20, the interlocking of the short fibers will be large, so that the form can be retained without the need for a binder, and the formed pores will be three-dimensional pores to increase the porosity. Further, the diameter of the metal short fibers is preferably, for example, about 1 to 3 $\mu$m. Further, regarding such metal short fibers, those obtained by a crystal-adjusting heat treatment disclosed in Japanese Examined Patent Publication No. 63-63645/1988 and being free from generation of burrs at cut end portions can be suitably used.

Further, the fine filtering layer 3 is provided with the undulating filtering surface 3A as described above and, with respect to the thickness T of the fine filtering layer 3, the average thickness T6 of the aforesaid fine filtering layer 3 at the bottoms 6A of the aforesaid valley portions 6 is set to be larger than the average thickness T5 of the aforesaid fine filtering layer 3 at the summits 5A of the crest portions 5, as shown in FIG. 4.

Here, if the aforesaid metal short fibers are used, the average thickness T6 of the filtering layer at the bottoms 6A is set to be, for example, about 0.2 to 1 mm, and the average thickness T5 of the filtering layer at the summits 5A to be about 0.05 to 0.5 mm. Furthermore, over the entire surface, the filtering layer does not have portions at which the thickness sharply changes, but has portions at which the thickness gradually changes, so that the thickness changes smoothly.

Such a distribution of the thickness T reduces the average thickness T5 of the fine filtering layer 3 at the summits 5A of the crest portions 5 at which the thickness of the supporting member 2 is large and, in combination with the fact that the filtering surface is made in a smoothly curved surface shape as described above, it absorbs the variation of the thickness of the supporting member 2 to provide a good balance of the flow characteristics over the entire filter.

More specifically described, in the case where a fine filtering layer 3 having the same thickness is laminated on the bottoms 6A of the valley portions 6 at which the thickness of the aforesaid supporting member 2 is small and on the summits 5A of the crest portions 5 at which the thickness of the aforesaid supporting member 2 is comparatively large, the valley portion 6 side naturally has a smaller flow resistance, so that a larger amount of the fluid to be processed flows, while the amount of the fluid passing through the summits 5A having a larger resistance is smaller, thereby inviting a difference in the flow rate. Therefore, by changing the thickness T of the fine filtering layer 3 at the crest portions 5 and at the valley portions 6 as described above, the thickness change at the support member 2 is canceled to make the filtration resistance uniform over the entire undulating filtering surface 3A and to increase the filtration area by undulation.

Further, by allowing the undulating filtering surface 3A to be smooth, problems of surface defects such as damage and exfoliation of the filtering layer can be prevented. Also, by thickening the fine filtering layer 3 on the valley portion 6 side, exfoliation from the support member and generation of surface cracks, which are liable to be generated by thermal contraction at the sintering time, can be reduced, thereby contributing to the prevention of the filtration precision of the filter.

In addition, the suspension immersion method disclosed in the aforesaid international publication WO93/06912 proposed by the present applicant can be applied to the aforesaid fine filtering layer 3 having a varying thickness. According to this method, a powdery substance in a suspension can be sucked and molded to be fitted onto the covering surface 4 of the uneven shape of the support member 3 for lamination.

Figure 7:
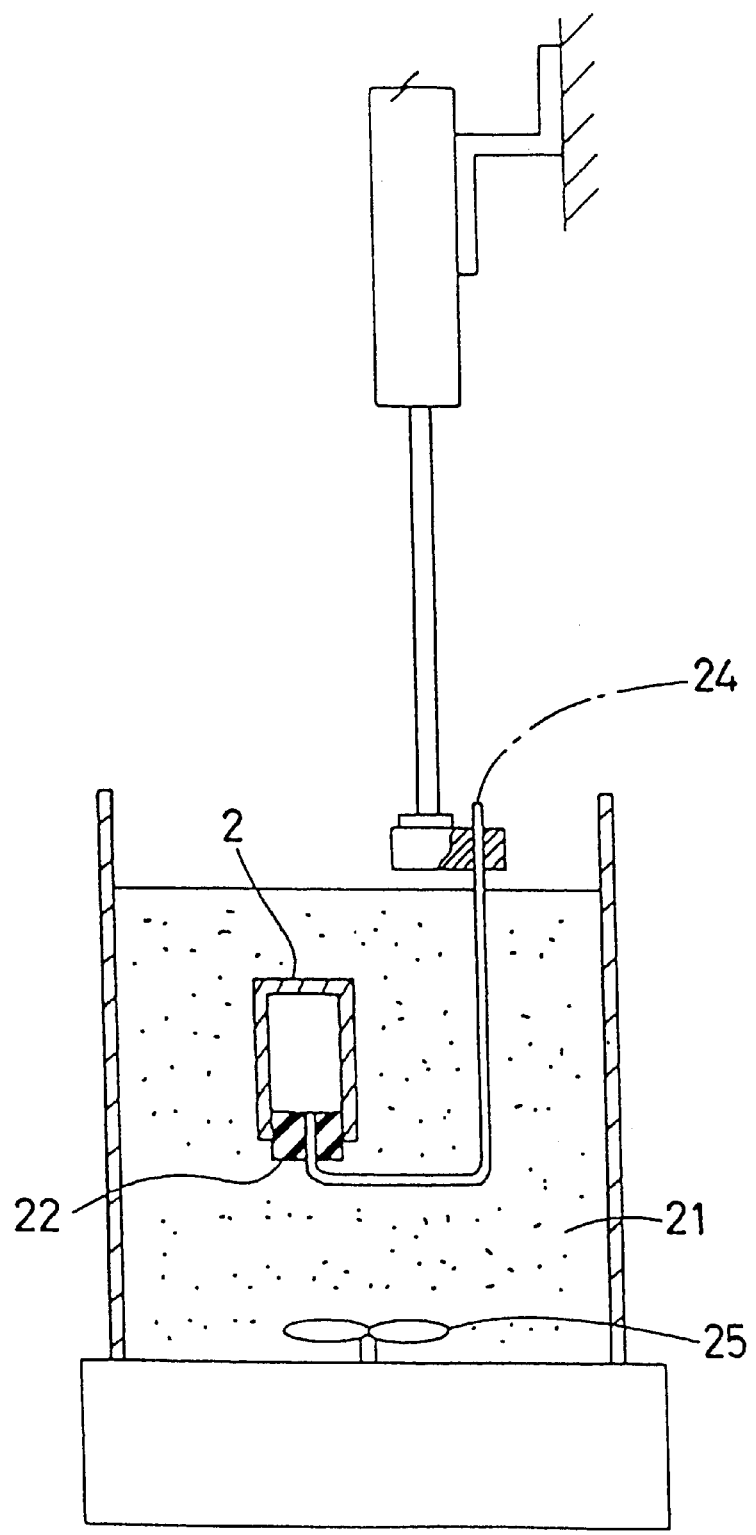
FIG. 7 is a schematic view illustrating an example of an apparatus used in the suspension immersion method.

The suspension immersion method is described in detail in the aforesaid publication. Referring to FIG. 7, the supporting member 2 is immersed in a suspension 21 containing a powdery substance suspended therein and evacuation is carried out to deposit the powdery substance onto the covering surface 4 to form the fine filtering layer 3.

In this example, the supporting member 2, which is the aforesaid tubular section 10, is made into a cup-shape for immersion by attaching the aforesaid lid 14 to the tubular section 10. The lid 14 is also made of a porous sintered body similar to the support member 2, and is integrated by a suitable fixing means such as electron beam welding. Also, it is possible to use a supporting member having the aforesaid lid 14 and the like integrally molded therewith in advance. Further, for immersion, the open end of the supporting member 2 is sealed by attaching and fixing a sealing plate 22 and is connected to a vacuum pump 24 for suction with the sealing plate 22 facing downwards.

The aforesaid supporting member 2 is immersed in said suspension 21 obtained by mixing the aforesaid powdery substance in pure water at a predetermined concentration and sufficiently stirred by rotating a rotor 25 for dispersing the aforesaid powdery substance. Then, suction is carried out with a suitable negative pressure force, for example, of about 0.2 to 5 kg/cm$^2$ for about 1 to 15 seconds, for example, 5 seconds, thereby to laminate and mold the aforesaid filtering layer 3 of the short fibers.

In this suspension immersion method, the amount of suction of the suspended particles can be varied by the aforesaid partial difference in the thickness of the supporting member 2 itself. As a result, a larger amount of particles adhere to portions having a smaller suction resistance (portions having a smaller thickness) to form a thick covering layer. In contrast, the amount of adhering particles is smaller at the aforesaid crest portions because the thickness of the supporting member itself is comparatively large to provide a larger flow resistance, whereby the thickness of the fine filtering layer 3 will be smaller. Thus, the suspension immersion method has been found to be an effective method for reducing the present invention into practice.

The molded product thus obtained is set in a sintering furnace for sintering in a non-oxidizing atmosphere having a temperature of about 1050° C. to form a metal filter 1, which is a porous sintered body. The metal filter 1 has metal short fibers randomly and three-dimensionally oriented, is capable of filtering particles of 0.003 μm at a precision of 10$^{-11}$, and is capable of reducing the pressure loss.

The metal filter of the present invention thus obtained can be used for filtration of fluids to be processed such as gases for various usage, for example, for the aforesaid semiconductors, air, water, and molten fluids, and achieves a highly precise and highly efficient filtration process. The shape may be one of a variety of shapes such as the aforesaid tubular shape, a disk-like shape, and a cup-like shape. Further, since the surface on the other side of the supporting member, i.e. the surface opposite to the covering surf ace, can be easily made flat, so that retention of the residues of the fluid to be processed, for example, is low.

EMBODIMENTS

Figure 6:
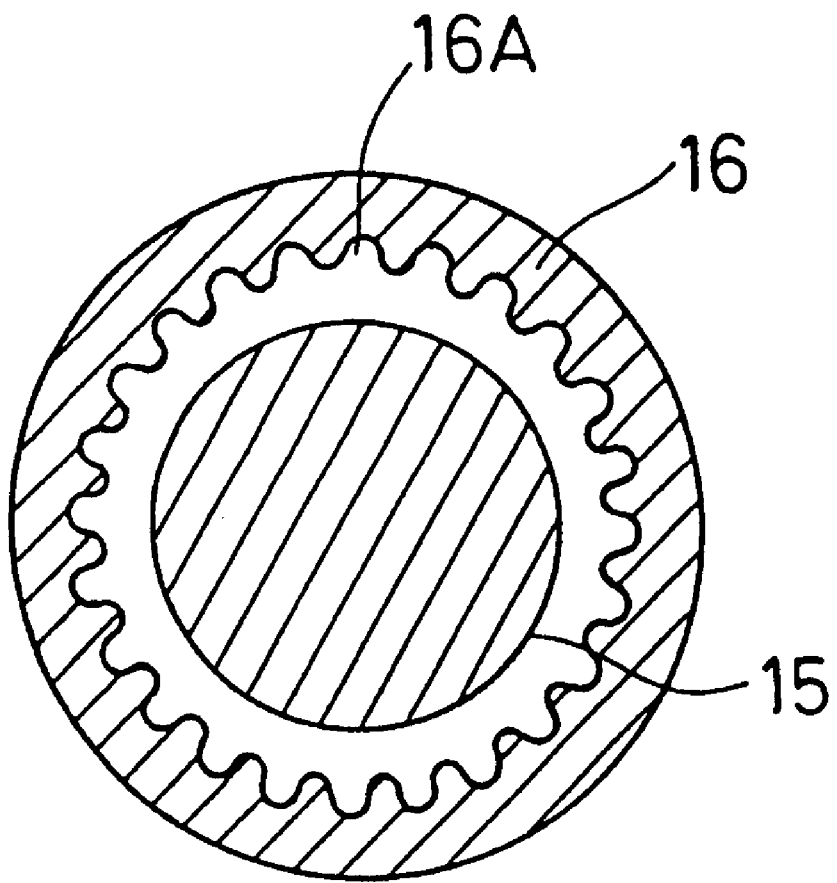
FIG. 6 is a cross section view illustrating an example of molds for molding a support member.

Atomized powder of stainless steel (having an average particle size of 15 μm) was introduced into a gap between an inner mold 15 and an outer mold 16 shown in FIG. 6 and then pressure-molded and sintered to produce a comparatively long porous sintered tubular body having an outer diameter of 32 mm and an inner diameter of 25 mm. The tubular body had an average porosity of 38% and a pore diameter of 5 μm. Further, on the outer circumference thereof, crest portions having a height of about 2 mm are continuously formed at a circumferential pitch of 2 mm (which is also a valley width in this example). Between the molds, the powder was pressurized at 200 kg/cm$^2$ and sintered under a condition with a temperature of 1150° C.×30 min. Here, the aforesaid molds were removed at an arbitrary early stage during the process, thereby to reduce the influence of the molds on the product as much as possible.

Next, the tubular body was cut into a length of 35 mm to form a supporting member. Referring to FIG. 7 one end of the supporting member was closed with a lid, and a sealing plate 22 was attached and fixed to the other end of the supporting member. The aforesaid supporting member was immersed, by means of a freely ascendable and descendable device, in a suspension obtained by suspending stainless steel short fibers (fiber diameter being 2 μm, aspect ratio being 8) in pure water at a predetermined concentration and sufficiently stirred by a rotor 25. Then, suction was carried out by means of a vacuum pump 24 at a pressure of, for example, 1 kg/cm$^2$ for about 5 seconds, thereby to laminate and mold a fine filtering layer of the aforesaid metal short fibers on the surface of the supporting member 2.

The metal filter thus obtained is a laminate having its outer surface side covered with the aforesaid fine filtering layer and having an undulating filtering surface. The metal filter is then set in a sintering furnace an d sintered in a non-oxidizing atmosphere of a temperature of 1050° C. FIG. 5 shows an example of a cross-sectional photograph (magnified by 100 times) of the sintered body obtained through this process.

A thickness distribution of the filtering layer 3 in this cross section was examined. The result showed a thickness of 0.15 mm at the bottoms and a thickness of 0.1 mm at the summits, and at the same time confirmed that its surface area was smoothly bent and laminated. The aforesaid area ratio S1/S0 was 2.03. Further, the presence or absence of surface defects of the filtering layer was examined in this filter. Though having an undulating structure, the filter had no generation of cracks or exfoliation, so that the filter had a property such that the entire filtering layer could be effectively used. Further, referring to FIG. 5, the metal filter 1 had a pore precision of being capable of filtering particles of 0.003 μm at a precision of 10$^{-11}$ owing to the three-dimensional random orientation of the metal short fibers. Also, there is an improvement in the pressure loss reduction as compared with those without an undulating filtering surface.

As described above, in the metal filter of the present invention, the fine filtering layer is made to be an undulating filtering surface and the filtration area is set to be larger than or equal to 1.3 times as large as the filtration area of the case where the uneven shape is not formed. Therefore, the filtration area is increased and the pressure loss is reduced to increase the filtration efficiency. Further, the pore diameter of the fine filtering layer is smaller than the pore diameter of the supporting member; and the fine filtering layer has a thickness of a degree such that it cannot by itself maintain its shape against filtration pressure, thereby improving the filtration precision and making further improvements in the pressure loss reduction. Further, the retaining strength can be maintained by the supporting member.

Moreover, by changing the thickness of the filtering layer in accordance with the undulation, the entire surface of the increased filtering surface can be effectively utilized, thereby improving the filtration characteristics and making it possible to apply the filter to any shaped product.

Furthermore, by suitably setting the ratio of the elevation height of the crest portions to the circumferential pitch, the filtration area can be effectively increased and the change of the thickness can be made smooth, thereby maintaining the adhesion strength between the fine filtering layer and the supporting member.

Also, a metal filter capable of effectively producing the aforesaid effects can be obtained by forming the aforesaid fine filtering layer as a porous sintered body of a powdery substance containing metal short fibers having an average diameter d smaller than or equal to 3 μm and an average of the aspect ratio L/d of the length L to the diameter d being 2 to 20, whereby the metal filter can be suitably used for filtration of a gas for producing semiconductors.

What is claimed is:

1. A metal filter comprising:
   a fine filtering layer, said fine filtering layer having a thickness that cannot, by itself, maintain its shape against filtration pressure, and
   a supporting member sintered to be porous and having a covering surface which integrates with the fine filtering layer as a laminate to maintain its shape, wherein
   an average pore diameter of pores of said fine filtering layer is set to be smaller than an average pore diameter of pores of said supporting member, and said covering surface of said supporting member is formed in an uneven shape having crest portions so as to allow a filtering surface of the fine filtering layer to be an undulating filtering surface such that an area ratio S1/S0, where S1 is the actual filtration area and S0 is the standard filtration area in the case where the supporting member is not formed in an uneven shape, is larger than or equal to 1.3, and wherein an average thickness of said fine filtering layer at valley portions between said crest portions is set to be larger than an average thickness of said fine filtering layer at the crest portions, and the filtering surface of said fine filtering layer is formed in a smoothly curved surface shape.

2. The metal filter according to claim 1, wherein the supporting member comprises a tubular body in which said crest portions are adjacent to one another in a circumferential direction and extend in an axial direction; and a pitch of the crest portions in the circumferential direction is 2 to 4 times as large as an elevational height of the crest portions from said valley portions to said crest portions.

3. The metal filter according claim 1, wherein said fine filtering layer comprises a sintered body of a powdery substance containing short metal fibers having an average diameter d smaller than or equal to 3 μm and an average aspect ratio L/d of length L to diameter d of 2 to 20.

4. The metal filter according to claim 1, used for filtering a gas so that the number of particles having a size larger than or equal to 0.01 μm is substantially less than or equal to $10^{-10}$; and said gas is used for producing semiconductors.

5. The metal filter according to claim 2, wherein said fine filtering layer comprises a sintered body of a powdery substance containing short metal fibers having an average diameter d smaller than or equal to 3 μm and an average aspect ratio L/d of length L to diameter d of 2 to 20.

6. The metal filter according to claim 2, used for filtering a gas so that the number of particles having a size larger than or equal to 0.01 μm is substantially less than or equal to $10^{-10}$; and said gas is used for producing semiconductors.

7. The metal filter according to claim 3, used for filtering a gas so that number of particles having a size larger than or equal to 0.011 μm is substantially less than or equal to $10^{-10}$; and said gas is used for producing semiconductors.

* * * * *